United States Patent
Dupuis

(10) Patent No.: US 7,182,182 B2
(45) Date of Patent: Feb. 27, 2007

(54) DRUM BRAKE AND BRAKE SHOE FOR ONE SUCH BRAKE

(75) Inventor: Vincent Dupuis, Vincennes (FR)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/495,471

(22) PCT Filed: Nov. 14, 2003

(86) PCT No.: PCT/EP03/12752

§ 371 (c)(1),
(2), (4) Date: May 13, 2004

(87) PCT Pub. No.: WO2004/048797

PCT Pub. Date: Jun. 10, 2004

(65) Prior Publication Data
US 2005/0205367 A1    Sep. 22, 2005

(30) Foreign Application Priority Data
Nov. 22, 2002   (FR) .................... 02 14781

(51) Int. Cl.
*F16D 55/08*   (2006.01)
*F16D 69/00*   (2006.01)

(52) U.S. Cl. ................. 188/72.9; 188/250 R

(58) Field of Classification Search ............... 188/72.9,
188/78, 79, 323, 325, 335, 340, 79.51, 79.55,
188/79.61, 250 R, 253, 257, 258, 250 A,
188/250 B See application file for complete search history.

(56) References Cited

U.S. PATENT DOCUMENTS

| 2,051,088 A | * | 8/1936 | Kittle et al. | 188/106 A |
| 2,503,489 A | * | 4/1950 | James, Jr. | 188/79.63 |
| 4,350,230 A | * | 9/1982 | Ingram et al. | 188/79 |
| 6,705,439 B1 | * | 3/2004 | Wang | 188/340 |

FOREIGN PATENT DOCUMENTS

| DE | 19906798 A | * | 8/2000 |
| GB | 1572744 A | * | 8/1980 |
| JP | 2002 106611 A | * | 4/2002 |

* cited by examiner

*Primary Examiner*—Pam Rodriguez
(74) *Attorney, Agent, or Firm*—Leo McCormick; Sarah Taylor

(57) ABSTRACT

A drum brake comprising a plate on which at least one shoe having a friction lining is mounted. A lever moves the shoe against a wheel drum in response to a braking command to effect a brake application. A resilient return spaces the shoe apart from the drum when braking ceases. The shoe is mounted to slide along an essentially radial axis between two guide walls secured to the plate The lever for applying the shoe bears against the inside wall of the shoe for exerting a substantially radial force.

5 Claims, 4 Drawing Sheets

DRUM BRAKE AND BRAKE SHOE FOR ONE SUCH BRAKE

The invention relates to a drum brake including a plate on which at least one shoe provided with a friction lining is mounted, application means for applying the shoe against a wheel drum in response to a braking command transmitted by a wheel cylinder, and resilient return means for spacing the shoe apart from the drum when braking ceases.

BACKGROUND OF THE INVENTION

Conventional-type drum brakes include an abutment that is fixed or that moves relative to the plate to which a first end of the shoe is fixed, which first end is opposite from a second end in contact with the wheel cylinder, the wheel cylinder transmitting the braking command directly to the shoe which is mounted to pivot relative to the plate at its end fixed to the abutment.

Drum brakes offer several advantages over disk brakes. For the same application force, the braking torque is generally larger in a drum brake than in a disk brake. The "handbrake" function is easier to install on a drum brake than on a disk brake. Therefore, drum brakes are still used, in particular on the back wheels of vehicles.

However, replacing a drum brake shoe when its friction lining is worn requires a relatively long disassembly and reassembly operation to be performed. In addition, the stability of the braking torque could be improved.

Because of the way forces exerted in the drum brake are distributed during braking, the shoe is subjected to a roll-up phenomenon that can reduce the stability of the braking and therefore the stability of the vehicle.

During braking, four forces are remarkable in a drum brake: firstly an inlet force at the contact between the wheel cylinder and the first end of the shoe, secondly an application force at the contact between the lining and the drum, thirdly a braking force at the point of contact between the second end of the shoe and the abutment, and fourthly a reaction force at the point of contact between the second end of the shoe and the abutment. The fact that the braking force and the reaction force are applied at the same point tends to give rise to shoe roll-up.

OBJECTS AND SUMMARY OF THE INVENTION

An object of the invention is above all to provide a drum brake in which shoe replacement is simplified, while braking torque stability is improved.

In the invention, in a drum brake of the above-defined type the shoe is mounted to slide along an essentially radial axis between two guide walls secured to the plate, and the application means for applying the shoe bear against the inside wall of the shoe of the drum, for exerting a substantially radial force.

In the invention, the braking force is separated from the application force.

A shoe whose friction lining is worn can be replaced easily because the shoe can be removed merely by being moved in translation, since it is not connected to the application means.

Preferably, the brake includes two shoes opposite from each other along a diametral axis, and mounted to slide along an essentially radial axis between respective pairs of guide walls, and application means for applying each shoe against the wheel drum in response to a braking command, the application means bearing against the inside wall of the shoe.

The angle through which each shoe extends is less than 60°.

Each shoe comprises a rigid support, in particular a metal support, and a friction lining fixed to the outside surface of the support. The ends of the rigid support form abutments suitable for bearing circumferentially against a corresponding guide wall.

The brake may be organized so that the axis of the reaction force is offset relative to the axis of the inlet force.

The application means may comprise a lever that is flat, that is in the shape of an outwardly convex arc of a curve, and that has one of its ends hinged to a fixed point of the plate and its other end subjected to a thrust force, generally exerted by a wheel cylinder piston in a direction suitable for applying the shoe against the drum, the lever coming to bear via its radially outermost edge against the inside wall of the corresponding shoe.

At its outside edge, the lever may be provided with a projecting portion forming a hump that comes to bear against the inside wall of the corresponding shoe. Preferably, the zone at which the lever bears against the inside face of the shoe is situated about half-way between the ends of the lever. The leverage ratio lies in the range 2 to 3.

The hinge whereby the lever is hinged to the plate may comprise, on the plate, a surface that is complementary with an end of the lever for guiding it.

The resilient return means may comprise first resilient return means for returning the lever and second resilient return means for returning the shoe. The second resilient return means for returning the shoe may comprise, at each circumferential end of the shoe, a spring clip engaging the plate and suitable for exerting a return force for returning the shoe radially inwards.

The friction lining is bonded to the rigid support, advantageously by being overmolded thereon.

In a variant embodiment, the brake drum further comprises a lever whose central portion is provided with a hinge for a control bar in the shape of an outwardly concave arc of a curve, each of the two ends of the control bar bearing against the inside face of a respective shoe. The drum brake may have two levers, two control bars, and four shoes, the resulting set being symmetrical about a diameter of the plate.

The invention also provides a shoe for a drum brake as defined above, said shoe comprising a rigid support for friction lining, the peripheral ends of said support forming abutments suitable for bearing circumferentially against guide walls, for slidable mounting along an essentially radial axis, the friction lining being fixed against the outside surface of the support.

The invention also provides a drum brake including a plate on which at least one shoe provided with a friction lining is mounted, an application lever for applying the shoe against a wheel drum in response to a braking command, and resilient return means for spacing the shoe apart from the drum when braking ceases, wherein, when the brakes are applied, a reaction force is applied to the application lever and a braking force is applied to the shoe so that said braking force and said reaction force are applied at two different points.

BRIEF DESCRIPTION OF THE DRAWINGS

Apart from the provisions set out above, the invention consists of certain other provisions that appear more explicitly below by means of embodiments which are described in detail with reference to the accompanying drawings, but which are in no way limiting.

In the drawings.

MORE DETAILED DESCRIPTION

Figure 1A:
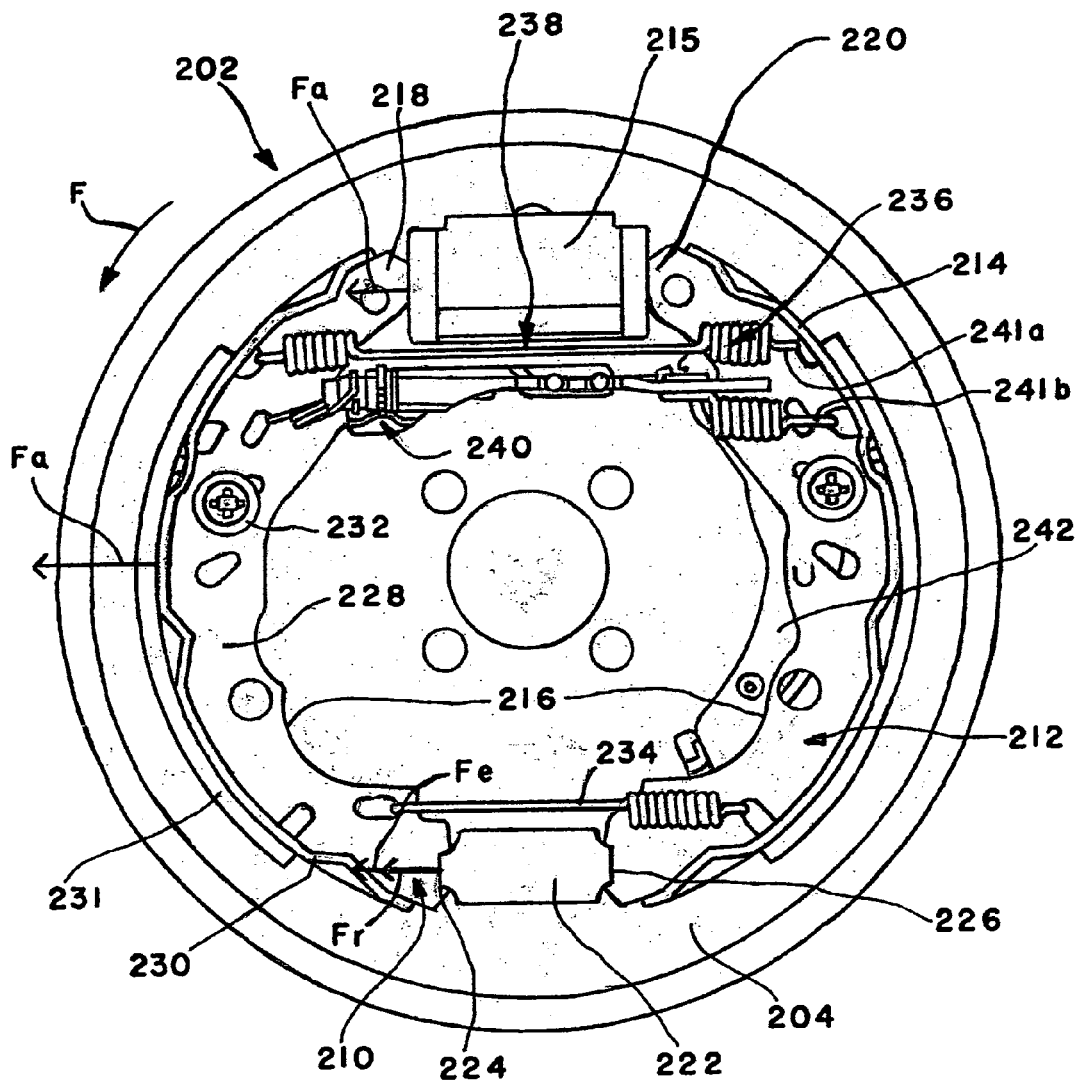
FIG. 1a is a simplified elevation view, with portions seen from the outside and with portions seen in section, showing a drum brake of a known type.

FIG. 1a shows a drum brake 202 of known type including a disk-shaped plate 204 organized to be fixed to a wheel arm of a vehicle, first and second shoes 210, 212 that are substantially circular arcuate in shape and that are mounted on the plate, their convex portions 214 facing towards the outside of the plate, and their convex portions 216 facing each other, a wheel cylinder 215 secured to the plate 204 and disposed between respective first ends 218, 220 of the first and second shoes 210, 212, and abutment means 222 secured to the plate 204 and disposed between second ends 224, 226 of the first and second shoes, and a drum (not shown) secured to the wheel and surrounding the convex portions 214 of the shoes 210, 212 with clearance.

Since the first and second shoes 210, 212 are symmetrical, only the first shoe is described below, while also specifying what is specific to it relative to the second shoe 212.

The first shoe 210 is held laterally to the plate by a helical spring 232 mounted in fixed manner relative to the plate 204 and perpendicularly thereto, and passing through the rim 228, said rim being nipped between two turns of the spring 232.

The first shoe 210 is held laterally to the plate by a helical spring 232 mounted in fixed manner relative to the plate 4 and perpendicularly thereto, and passing through the rim 228, said rim being nipped between two turns of the spring 232.

The second ends 224, 226 of the first and second shoes are held in abutment against the abutment means 222 by coupling means 234 for coupling together the two shoes, the coupling means 234 being formed in part by a helical spring.

The drum brake 202 also includes return means 236 for urging the shoes back towards the inside of the plate 204 and formed in part by two resilient elements, and a spacer 238 disposed below the wheel cylinder and parallel to the longitudinal axis X of the wheel cylinder. The spacer is also provided with wear take-up means 240 for taking up wear in the brake linings, which means are of known type that is not described in detail. The spacer 238 is held to the first and second shoes 210, 212 by respective springs 241a and 241b of the return means 236.

The wheel cylinder is fed in known manner via a hydraulic circuit, e.g. including a master cylinder and a power-assisted braking servomotor actuated by a brake pedal (none of these elements being shown). The wheel cylinder has a first and second pistons (not shown) suitable for moving apart from each other along the axis X under drive from hydraulic fluid under pressure, the pistons then being applied against the first ends 218, 220 of the shoes 210, 212 and pushing them outwards.

The drum brake is also provided with a second actuator comprising a parking brake lever 242 that makes it possible to hold the motor vehicle stationary when it is parked, and that is not described in detail.

When the brakes are applied, with the drum turning in the direction indicated by arrow F, it can be observed that four forces are applied to each shoe 210, 212. These four forces are described as applied to the first shoe 210.

An "inlet" first force Fe is applied at the contact between the wheel cylinder 215 and the first end 218 of the first shoe 210, an "application" second force Fa is applied at the contact between the lining 231 and the drum, a "braking" third force Ff is applied at the point of contact between the second end 224 of the shoe and the abutment 222, and a "reaction" fourth force Fr is also applied at the point of contact between the second end 224 of the shoe and the abutment 222. The fact that the braking force Ff and the reaction force Fr are applied at the same point tends to give rise to shoe roll-up.

The present invention solves that problem.

Figure 1B:
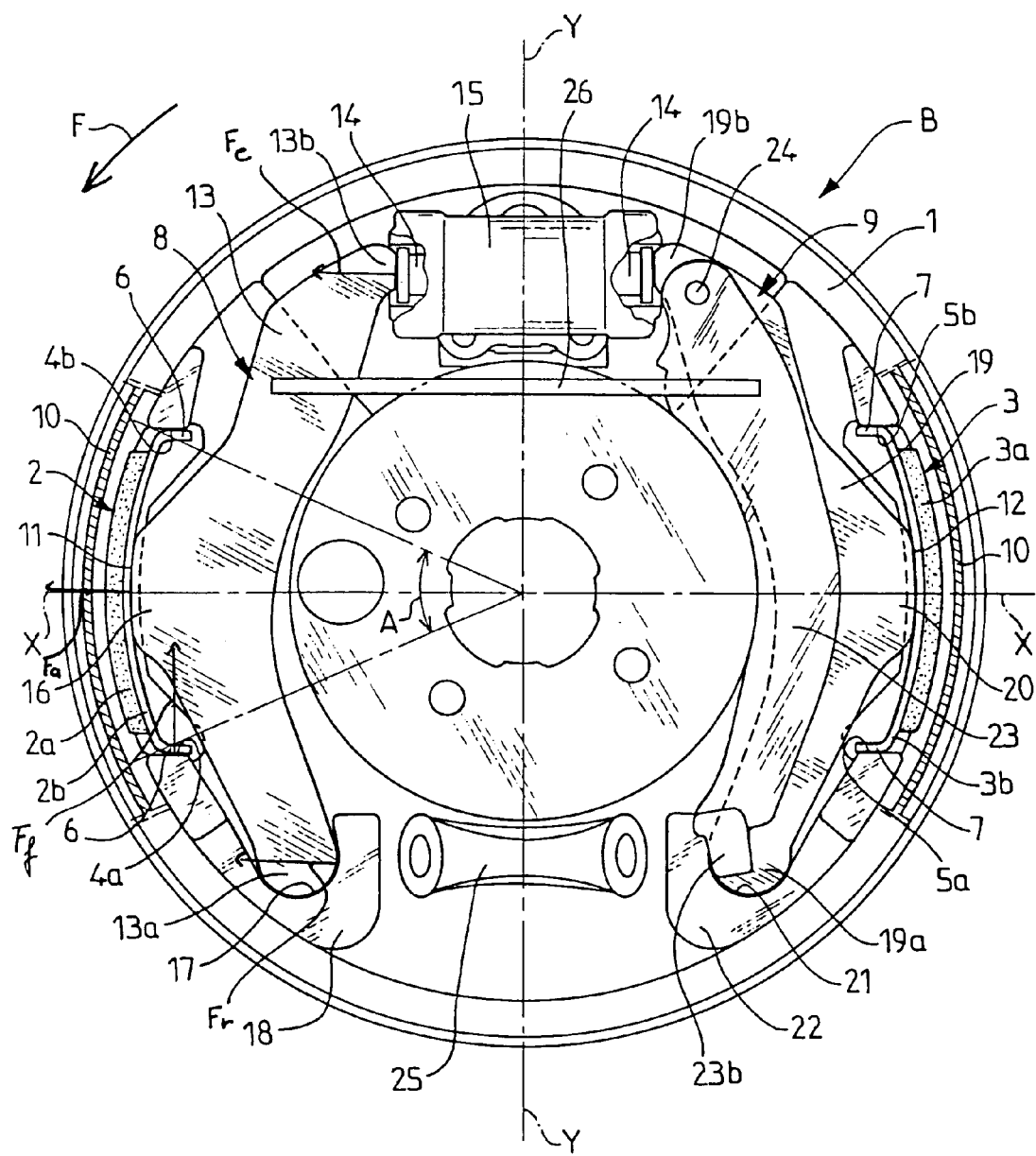
FIG. 1b is a simplified elevation view, with portions seen from the outside and with portions seen in section, showing a drum brake of the invention.

FIG. 1b shows a drum brake B including a plate 1 organized to be fixed to a vehicle wheel arm. Two shoes 2, 3 disposed opposite each other along a diametral axis X—X are mounted to slide along said axis between respective guide walls 4a & 4b and 5a & 5b secured to the plate 1.

Each shoe 2, 3 is provided with a friction lining 2a, 3a fixed by bonding, preferably by overmolding, onto a rigid support 2b, 3b.

Each support 2b, 3b is formed by a metal strip. In the examples shown in FIGS. 1 and 2, the support strip 2b, 3b is curved to form a circular arc whose outside surface corresponds to a cylindrical surface portion that is convex facing radially outwards. The linings 2a, 3a are fixed to the cylindrical outside surfaces of the supports. The peripheral ends of the supports 2b, 3b form abutments 6, 7 suitable for pressing circumferentially against respective ones of the guide walls 4a to 5b while retaining freedom of movement in radial translation. The abutments 6 and 7 can be constituted by the rectilinear edges of the supports 2b, 3b folded over parallel to the slide axis X—X.

The angle A through which each shoe 2, 3 extends is less than 60° and preferably less than 50°, this numerical example being non-limiting. The angle A is less than the angle through which a conventional drum brake shoe extends, which makes it possible to reduce considerably the volume of friction lining 2a, 3a, while retaining a substantially equivalent life span. This reduction in lining volume compared with the lining volume in a conventional drum brake can be as high as 60%.

Figure 5:
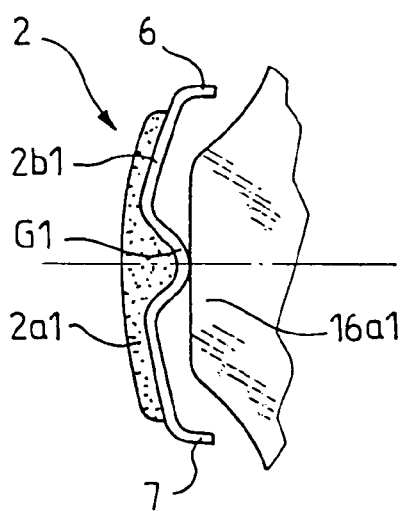
FIG. 5 is a fragmentary diagrammatic view of a variant implementation of how the lever bears against the shoe.

FIG. 5 shows a variant in which the metal strip 2b1 is essentially plane, but with a piece in relief half way along its peripheral length, which piece in relief has generator lines perpendicular to the plane of the figure, forming a V-shaped projection G1 on the side opposite from the lining 2a1.

Figure 6:
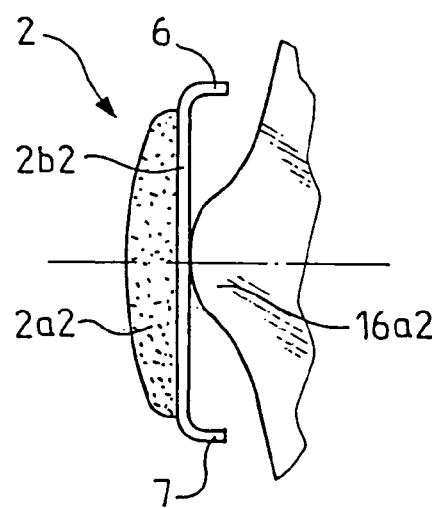
FIGS. 6 to 8 are fragmentary diagrammatic views of other variant implementations of how the lever bears against the shoe.
Figure 7:
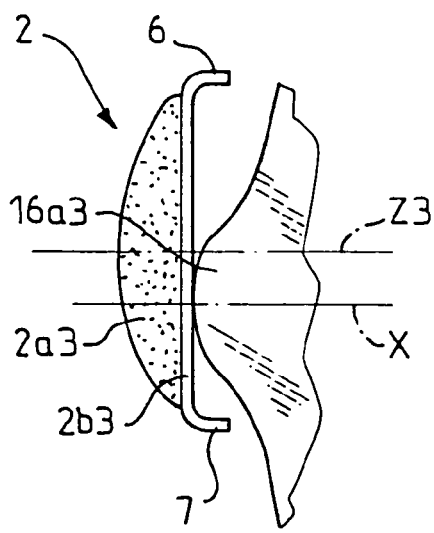

FIGS. 6 and 7 show metal strips 2b2, 2b3 that are plane. The friction lining in FIG. 7 is overmolded onto the strip 2b3.

Figure 8:
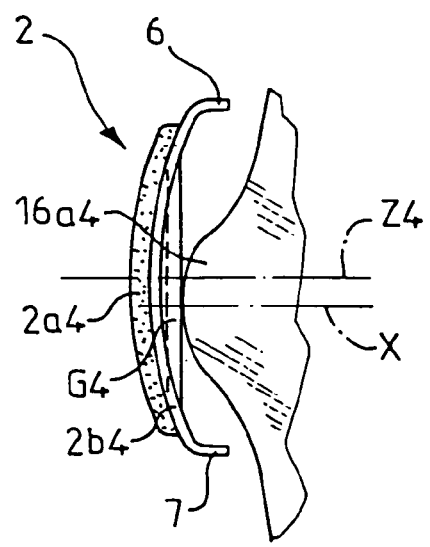

FIG. 8 shows a metal strip 2b4 curved as in FIG. 1b, but that, substantially half way along its dimension perpendicular to the plane of the figure, has a piece in relief forming a projection G4 with a plane surface on its side opposite from the friction lining 2*a*4, which is bonded to the strip 2*b*4.

The guide walls 4*a*–5*b* parallel to the diameter X—X are constituted by faces of blocks that are secured to the plate 1 and that project perpendicularly to the midplane of said plate.

The co-operation between the shoes 2 & 3 and the guide walls 4*a*–5*b* is organized so as to enable the linings to be extracted or put in place between the guide walls by a movement in translation along an axis orthogonal to the midplane of the plate 1, i.e. orthogonal to the plane of FIG. 1*b*.

The brake B is provided with application means 8, 9 for applying each shoe 2, 3 against a wheel drum 10 that is shown in part, and that turns with the wheel of the vehicle, e.g. in the direction indicated by arrow F in FIG. 1*b*.

Each of the application means 8, 9 merely bears via a respective zone 11, 12 against the inside wall of the corresponding shoe 2, 3 so as to exert a force that is substantially radial.

The application means 8 for applying the shoe 2 comprise a lever 13 that is substantially in the shape of an arc of a curve, that is convex facing outwards, and that has one end 13*a* hinged about a fixed point of the plate 1 and its other end 13*b* in abutment against a piston 14 of a wheel cylinder 15 mounted on the plate. The piston 14 can exert a thrust force on the end 13*b* substantially parallel to the diameter X—X.

The lever 13 is flat, and advantageously cut out from a metal sheet. On its radially outermost edge, and substantially half way between its ends 13*a*, 13*b*, it has a projecting portion 16 forming a hump whose peripheral edge constitutes the bearing zone 11.

The bearing zone 11, 12 of the lever 13, 19 via which it bears against the inside face of the shoe is situated about half-way between the ends of the lever. The leverage ratio is equal to the ratio between firstly the distance between the hinge point 13*a* and the point at which the force from the piston 14 is applied to the lever and secondly the distance between the hinge point 13*a* and the bearing zone 11, 12. Said leverage ratio advantageously lies in the range two to three.

In the example shown in FIGS. 1 and 6, the projection 16 or 16*a*2 has a convex outside edge bearing against the support 2*b*, 2*b*2. In FIG. 5, the outside edge of the projection 16*a*1 is rectilinear and bears against the support 2*b*1. In FIGS. 1, 5, and 6, the configuration is such that the axis of the inlet force and the axis of the reaction force coincide.

In FIGS. 7 and 8, the configuration is such that an offset exists, to one side or the other, between the axis X of the inlet force, and the axis Z3, Z4 of the reaction force. In certain cases, a suitable offset can procure improved stability and improved lining wear; the performance of the brake is improved. In FIG. 7, the projection 16*a*3 has a convex outside edge bearing against the flat support 2*b*3. In FIG. 8, the projection 16*a*4 bears via its convex outside edge against the plane surface of the projection G4.

Figure 2:
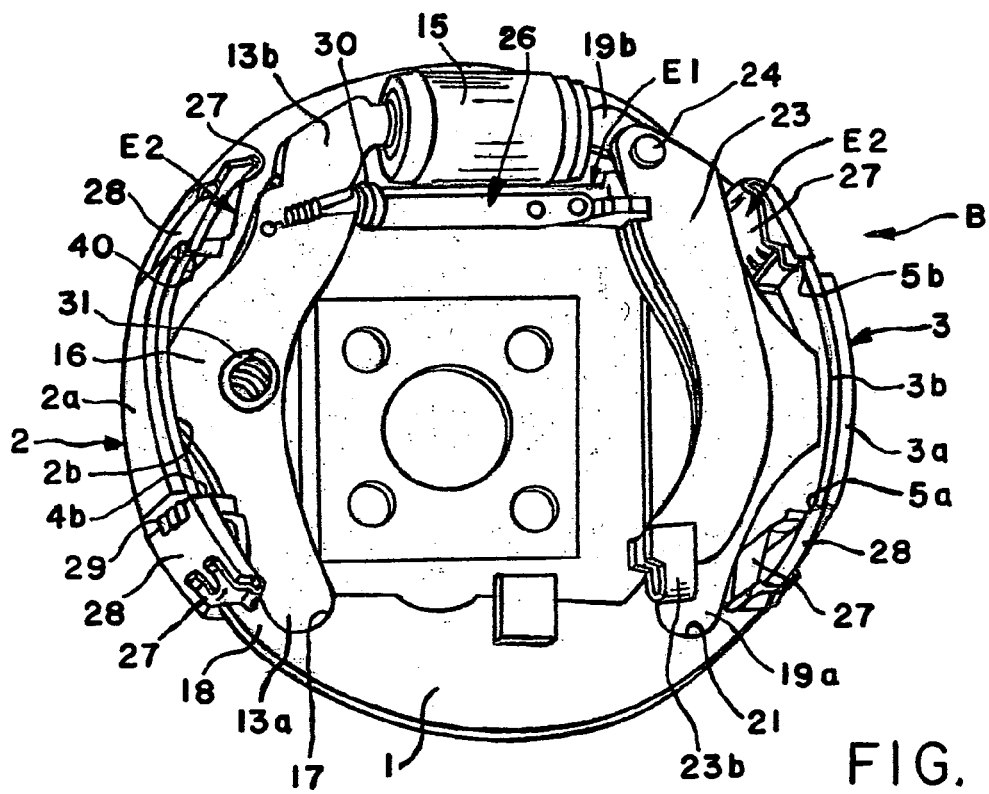
FIG. 2 is a perspective view of the brake as extracted from the drum.

In FIGS. 1 and 2, the end 13*a* is circularly convex in part, and it is received in a cavity 17 constituting a complementary surface 13*a* and provided in a projection 18 of the plate 1. The end 13*a* is also hinged to pivot about an axis that is perpendicular to the plate 1.

Figure 4:
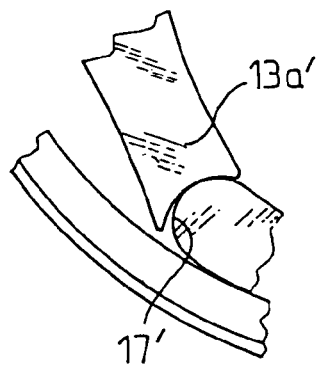
FIG. 4 is a fragmentary diagrammatic view of a variant implementation of how the lever is hinged.

FIG. 4 shows a variant embodiment in which the end 13*a*' of the lever is concave and the complementary surface 17' integral with the plate is convex, bearing against 13*a*'.

The application means 9 comprise a lever 19 situated, relative to the lever 13, on the other side of an axis Y—Y orthogonal to X—X and passing through the center of the plate 1. The top end 19*b* is pushed by another piston 14 of the cylinder 15. The outside edge of the lever 19 bears via the edge of a hump 20 against the shoe 3. The bottom end 19*a*, which is circular in part, is received in the circular cavity 21 in a projection 22 of the plate 1. The way in which the hump 20 bears against the shoe can be as in variants shown in FIGS. 5 to 8.

A handbrake control lever 23 is hinged to a pin 24 carried by the lever 19 in the vicinity of its end 19*b*. That end 23*b* of the lever which is opposite from the pin 24 is folded over so as to facilitate hooking a traction cable (not shown) that passes through a guide 25 fixed to the plate 1.

A spacer 26 is provided between the lever 13 and the levers 19 and 23 so as to limit the return stroke over which the ends 13*b*, 19*b* can return towards each other under the action of first resilient return means E1 (FIG. 2) tensioned between zones adjacent to said ends.

Second resilient return means E2 (FIG. 2) are provided for each shoe 2, 3. At each circumferential end of the shoe 2, 3, each second resilient means E2 comprises a spring clip 27 engaging a projection 28 secured to the plate 1 and orthogonal thereto. The clip 27 passes under the projection 28. The guide walls such as 4*a* are provided on the edge of the projection 28 facing the shoe 2 or 3. In its middle portion, each guide wall is provided with a recess via which the clip 27 rises to hook, via teeth 29, onto the top edge of the support 2*b*, 3*b* and to return it radially inwards. The clips 27 make it possible to avoid or at least to reduce rattle due to the shoes 2, 3 oscillating or vibrating. This example of resilient return means E2 is non-limiting, it being possible to use other equivalent means.

The spacer 26 provided between the lever 13 and the lever 23 and/or the lever 19 is preferably provided with a device 30 for automatically taking up wear in the friction linings by modifying the length of the spacer 26 in order to compensate for wear in the linings.

The levers 13, 19 can be held in the direction perpendicular to the plane of FIG. 1*b* by means of springs 31 (FIG. 2), each having an axis perpendicular to the plate 1 and having one end connected to said plate. Each spring 31 is received in tight-fitting manner in a respective hole in the lever, and enables the lever to move to a certain extent. Other equivalent holding means can be provided for holding the levers.

The drum brake of FIGS. 1 and 2 operates as follows. It is assumed that the drum 10 turns in the direction indicated by arrow F of FIG. 1.

When the brakes are applied, liquid under pressure is sent into the cylinder 15 between the pistons 14 which move apart while pushing the ends 13*b*, 19*b* of the levers 13 and 19. Said levers pivot in respective ones of the cavities 17 and 21 and they exert substantially radial thrust via their humps 16, 20 against the support 2*b*, 3*b* of the associated shoe. The shoe slides substantially radially between the respective guide walls, and comes to apply against the inside surface of the drum 10 for exerting the braking.

A friction reaction acting on the lining 2*a* applies the downstream edge of the support 2*b* against the abutment wall 4*a* in the direction indicated by arrow F. The shoe 2 is compressed against said abutment 4*a*. The shoe 3 is compressed against the abutment 5*b*. The shoe then applies a braking force Ff against the guide wall 4*a* in the direction indicated by arrow Ff.

A reaction force Fr then applies against the end 13*a* of the shoe in contact with the abutment 18 as indicated by arrow Fr.

Therefore, the braking force Ff and the reaction force Fr apply at two distinct points, thereby considerably increasing the stability of the braking torque.

By leverage, the force applied by the piston 14 to the corresponding end 13b or 19b is multiplied substantially by two at the hump 16, 20 and at the shoe 2, 3.

The two shoes 2, 3 working in compression makes it possible to reduce the volume of friction lining compared with the volume of friction lining in a conventional drum brake, in which one of the shoes is compressed and the other is pulled or tensioned. The forces are better distributed over the plate 1 and the stability of the braking torque is improved.

Manufacturing is simplified compared with a conventional shoe in which the support 2b, 3b for the friction lining is bonded to the lever-forming portion 13, 19. In the invention, that bonding is omitted, with the wall 2b, 3b being free relative to the lever 13, 19 which merely bears against it.

The flat levers 13, 19 are made easy to assemble by means of the hinge 3a & 17 or 19a & 22. The shoes 2, 3 are easy to replace when the linings 2a, 3a are worn. After the drum has been removed to give access to the plate 1, the worn shoes can be extracted by moving them in translation along an axis perpendicular to the plane of FIG. 1b between the walls 4a & 4b and 5a & 5b, and new shoes can be put back in place. The length of the adjustable spacer 26 is adjusted to take account of the increase in thickness of the friction linings when they are replaced.

The handbrake can be actuated by exerting traction on the bottom end 23b of the lever 23 from right to left in FIG. 1b, via a cable (not shown). The lever 23 turns clockwise as shown in FIG. 1b about the pin 24, and, via the spacer 26, pushes the lever 13 which applies the shoe 2 against the drum 10. The lever 23 pivots against the spacer 26 by reaction, and pushes back the pin 24 and the lever 19 towards the right of FIG. 1b. This causes the shoe 3 to be applied against the drum 10.

Figure 3:
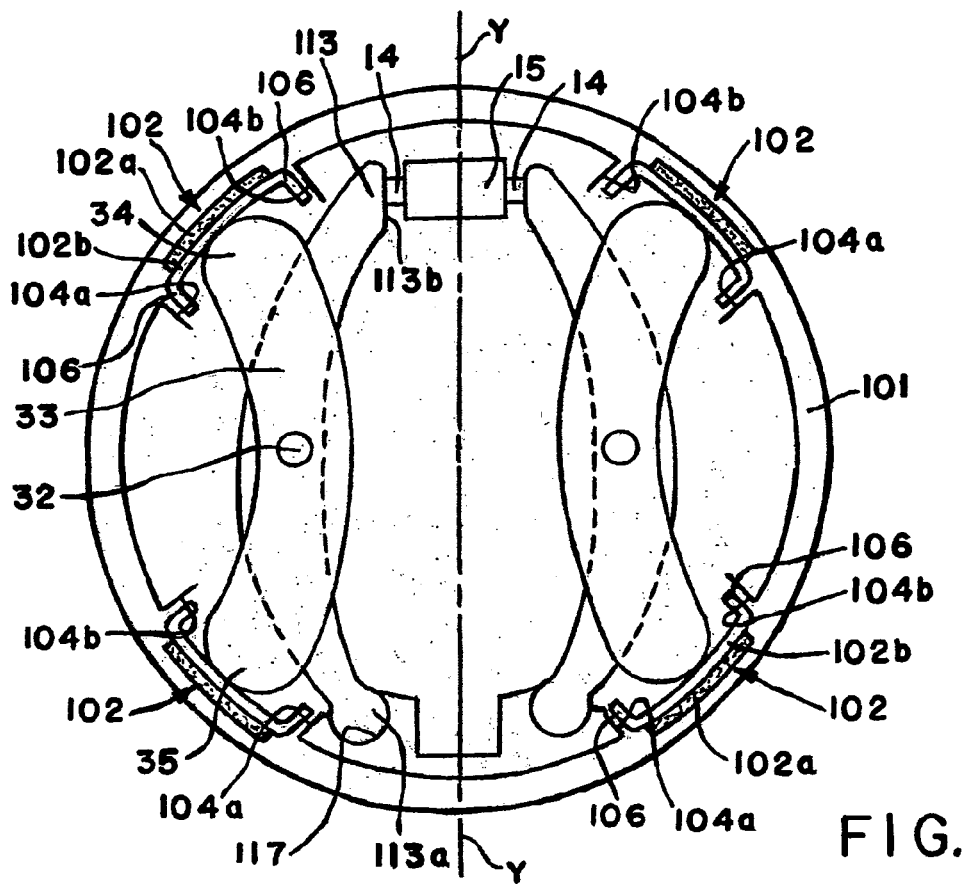
FIG. 3 is a fragmented diagrammatic view of a variant embodiment.

FIG. 3 is a fragmentary diagrammatic view of a variant embodiment. Like elements or elements that act similarly to the way in which the elements described above with reference to the preceding figures act are designated by like numerical references, possibly plus 100, and they are not described again.

In its central portion, the lever 113 is provided with a hinge pin 32 for a curved flat control bar 33 whose concave face faces outwards. Each of the two ends 34, 35 of the control bar has a rounded convex shape, and bears against the inside face of a shoe 102 mounted to slide radially between walls 104a, 104b secured to the plate 101. The two ends 34, 35 of the control bar 33, and the associated shoes 102 are situated on the same side of the diameter Y—Y of the plate 101 that passes through the middle of the cylinder 15.

When its top end 113b is pushed by the piston 14, the lever 113 controls the two associated shoes 102 via the control bar 33.

Another lever, another control bar, and two other shoes, symmetrical about the axis Y—Y, are generally provided. The drum brake then has four shoes 102 that are symmetrical in pairs about the axis Y—Y.

Regardless of the variant embodiment, the improvement in the stability of the braking torque can be reinforced by controlling and modulating the pressure of the fluid in the brake circuit.

Assembling the friction linings to the supports does not involve riveting or crimping.

Optionally, the bottom hinge points such as 13a–17 of the levers can be omitted with another wheel cylinder similar to the cylinder 15 being put in place between the two bottom ends of the levers.

What is claimed is:

1. A drum brake including a plate on which a first brake having a friction lining and a second brake shoe having a friction lining are mounted, application means for applying a force moves said first and second brakes shoes against a wheel drum in response to a braking command, and resilient return means for spacing said first and second brake shoes apart from the wheel drum when braking ceases, said first and second brake shoes each being mounted to respectively slide along an essentially radial axis between first and second guide walls secured to said plate, said application means for moving said first and second brake shoes bearing against end exerting a substantially radial force on an inside wall of said first and second brake shoes through a lever arrangement including a first lever having a first end for receiving the braking command and a second end that is located on said plate to define a first hinge and a second lever having a first end for receiving said braking command and a second end that is located on said plate to define a second hinge, a first control bar attached to said first lever through a first hinge pin and a second control bar attached to said second lever through a second hinge pin, said radial force being derived from the braking command said first and second levers respectively pivoting about said first and second hinges and said first and second control bars respectively pivoting about said first and second hinge pins such that said first and second brake shoes move along a radial plane with respect to said first and second guide walls.

2. The drum brake according to claim 1, wherein a leverage ratio of the braking command and the radial force lies in the range 2 to 3.

3. The drum brake as recited in claim 2 wherein said first brake shoe has a first segment and a second segment that are spaced apart from each other and said first control bar has a first end that engages an inside face on said first segment thereof and a second end that engages an inside face on said second segment thereof and where said second brake shoe has a first segment and a second segment that are spaced apart from each other and said second control bar has a first end that engages an inside face on said first segment of said second brake shoe and a second end that engages an inside face on said second segment of said second brake shoe such that the radial force derived from the braking force is uniformily applied through the first and second brake shoes to effect a brake application.

4. The drum brake according to claim 3, wherein the drum brake is organized so that an axis of the reaction force is offset relative to an axis of the inlet force.

5. The drum brake as recited in claim 3 wherein a zone at which the first and second control bars respectively bear against the inside face of the first and second segments of said first and second shoes is situated about half-way between the ends of each segment.

* * * * *